US010735556B2

(12) United States Patent
Muñoz de la Torre Alonso et al.

(10) Patent No.: US 10,735,556 B2
(45) Date of Patent: Aug. 4, 2020

(54) CONTROL SIGNALLING IN SDN ARCHITECTURE NETWORKS

(71) Applicant: Telefonaktiebolaget LM Ericsson (publ), Stockholm (SE)

(72) Inventors: Miguel Angel Muñoz de la Torre Alonso, Madrid (ES); Stephen Terrill, Madrid (ES)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 449 days.

(21) Appl. No.: 15/545,121

(22) PCT Filed: Feb. 3, 2015

(86) PCT No.: PCT/EP2015/052145
§ 371 (c)(1),
(2) Date: Jul. 20, 2017

(87) PCT Pub. No.: WO2016/124222
PCT Pub. Date: Aug. 11, 2016

(65) Prior Publication Data
US 2018/0241844 A1    Aug. 23, 2018

(51) Int. Cl.
*G06F 13/00* (2006.01)
*H04L 29/08* (2006.01)
(Continued)

(52) U.S. Cl.
CPC .......... *H04L 67/327* (2013.01); *H04L 43/028* (2013.01); *H04L 45/70* (2013.01); *H04L 69/329* (2013.01)

(58) Field of Classification Search
CPC ..... H04L 67/327; H04L 45/70; H04L 43/028; H04L 69/329
(Continued)

(56) References Cited

U.S. PATENT DOCUMENTS 8,270,413 B2* 9/2012 Weill .................. H04L 12/4633
                                                                370/389
10,230,627 B2* 3/2019 Ren ......................... H04L 45/30
(Continued)

OTHER PUBLICATIONS

Arefin, A. et al., "OpenSession: SDN-based Cross-layer Multi-stream Management Protocol for 3D Teleimmersion" 2013 21st IEEE International Conference on Network Protocols, Oct. 7, 2013, pp. 1-10.
(Continued)

*Primary Examiner* — Kenneth R Coulter
(74) *Attorney, Agent, or Firm* — Patent Portfolio Builders, PLLC

(57) ABSTRACT

There is provided a software-defined networking, SDN, architecture network, comprising a first network node (100) and a second network node (300), the first network node being configured to transmit data packets comprising: user data packets belonging to two or more user data packet flows, the user data packets of each user data packet flow comprising user data plane information; and control data packets each comprising OSI layer 7, L7, information for controlling the processing by the second node of the user data packets of a respective one of the user data packet flows. The SDN architecture network further comprises an SDN architecture forwarding element configured to forward user data packets received from the first node towards the second node using forwarding information that links a forwarding address to information in an IP 5-tuple of a data packet. The forwarding element is further configured to selectively forward a control data packet received from the first node towards the second node by: receiving and storing L7 information and the forwarding information; performing deep-packet inspection of the received control data packet to extract the L7 information therein, and selecting the received control data packet for forwarding towards the second node (Continued)

when the received control data packet comprises L7 information matching the stored L7 information; determining information in the IP 5-tuple of the received control data packet; and, where the received control data packet has been selected for forwarding, forwarding said control data packet towards the second node using the forwarding information and the information in the IP 5-tuple of the control data packet. The SDN architecture network also includes a controller (620) configured to transmit the L7 information and the forwarding information to the forwarding element (610).

24 Claims, 9 Drawing Sheets

(51) Int. Cl.
*H04L 12/26* (2006.01)
*H04L 12/721* (2013.01)

(58) Field of Classification Search
USPC .......................................... 709/217–219, 224
See application file for complete search history.

(56) References Cited

U.S. PATENT DOCUMENTS

| | | | |
|---|---|---|---|
| 2007/0121615 A1* | 5/2007 | Weill | H04L 12/4633 370/389 |
| 2014/0173018 A1 | 6/2014 | Westphal et al. | |
| 2016/0142290 A1* | 5/2016 | Ren | H04L 45/30 370/392 |
| 2019/0215306 A1* | 7/2019 | Gopal | H04L 63/0218 |
| 2019/0215307 A1* | 7/2019 | Gopal | G06F 9/45558 |

OTHER PUBLICATIONS

Zhang, Y. et al., "StEERING: A Software-Defined Networking for Inline Service Chaining", 2013 21st IEEE International Conference on Network Protocols, Oct. 7, 2013, pp. 1-10.

Heinonen, J., "Dynamic Tunnel Switching for SDN-Based Cellular Core Networks", All Things Cellular: Operations, Applications & Challenges, Aug. 22, 2014, pp. 27-32.

3rd Generation Partnership Project, "Technical Specification Group Core Network and Terminals; Interworking between the Public Land Mobile Network (PLMN) supporting packet based services and Packet Data Networks (PDN) (Release 12)", 3GPP TS 29.061 V12.8.0, Dec. 2014, pp. 1-168.

* cited by examiner

CONTROL SIGNALLING IN SDN ARCHITECTURE NETWORKS

TECHNICAL FIELD

The present disclosure generally relates to the field of Software-Defined Networking (SDN) architecture networks and, more specifically, to techniques for selectively forwarding control signalling packets between nodes in SDN architecture networks.

BACKGROUND

FIG. 1 is a schematic diagram illustrating some of the components in a "traditional" (i.e. non-SDN architecture) network. In this example, a first node 100 of a type "A" is arranged to communicate with a plurality of user terminals (by way of example, four such user terminals are shown, as UE1 to UE4) by any suitable means, e.g. via an IP backbone Core Network (CN) 200 that includes a Serving GPRS Support Node (SGSN). In this example, the first node 100 is statically connected to a second node 300 of a type "B" by a network 400 comprising one or more appropriately configured forwarding elements (e.g. routers and switches), or by physically connecting the first and second nodes, e.g. via point-to-point links. By way of example, the first node 100 is provided in the form of a Gateway such as a Packet Data Network Gateway (PDN-GW) or a Gateway GPRS Support Node (GGSN), which may, as in the present example, include a Policy and Charging Enforcement Function (PCEF). The second node 300 may, as in the present example, be provided in the form of a value-added service (VAS) node configured to provide a value-added service in the form of content filtering, which requires application service detection based on Deep Packet Inspection (DPI) of received user data packets. The second node 300 may alternatively or additionally provide another kind of VAS, such as HTTP Header Enrichment. Regardless of the type of VAS being applied, DPI technology is used to classify IP packets according to a configured tree of rules, assigning classified IP packets to one or more associated service sessions. As is well-known, Shallow Packet Inspection (SPI) refers to packet inspection up to OSI Layer 3 or OSI Layer 4, whereas DPI refers to packet inspection beyond the level of SPI, from OSI Layer 4 or 5 up to OSI layer 7. DPI has been standardized in 3GPP Rel11, in the so-called Traffic Detection Function (TDF), which refers to a stand-alone node. However, DPI functionality may, as in the present example, run collocated with PCEF.

To provide the value-added service to one of the user terminals UE1 to UE4, the first and second nodes 100 and 300 need to exchange between them user data packets conveying user data plane information (e.g. samples of a VoIP call, multimedia information, HTTP Requests and responses etc.) as well as control data packets conveying control signalling for managing the processing of data packet flows carrying the user data plane information. The control data packets may, for example, be exchanged using the RADIUS protocol, for purposes such as identification, authentication, authorization etc. In the present example, the RADIUS signaling is used by the second node 300 to retrieve relevant subscriber session parameters (e.g. a subscriber identifier such as IMSI, MSISDN, or another parameter such as the UE's location, etc.), specifically to identify the user or other relevant parameter and apply the corresponding content filtering functionality.

As the first and second nodes 100 and 300 are statically connected to each other by the network 400, all data packets (each being either a user data packet or a control data packet) will be forwarded from the first node 100 to the second node 300. This is illustrated in FIG. 1, where there are four different user sessions (relating to UE1, UE2, UE3 and UE4) and where RADIUS messages (R1, R2, R3 and R4) and user data traffic (D1, D2, D3 and D4) are all routed to the second node 300.

Software Defined Networking (SDN) is an emerging network architecture which addresses a shortcoming of the static architecture of conventional networks, namely that it is ill-suited to the dynamic traffic steering needs of today's packet backbone networks. SDN decouples the network control and forwarding functions, and logically centralizes network intelligence and state. This enables network control to be directly programmable, and the underlying infrastructure to be abstracted for applications and network services. In SDN, the control plane logic is handled by a logically centralised server (the so-called "SDN controller"), and the forwarding plane consists of simplified forwarding elements (so-called "OpenFlow Switches" (OFS) in the context of the OpenFlow protocol) that are programmed by the SDN controller.

Thus, in contrast to the "traditional" network architecture outlined above, SDN architectures provide the advantage of allowing the routing of information between the nodes to be configured, changed or otherwise managed in a dynamic and easy manner, by allowing the forwarding elements in the network to be dynamically and easily configured and adjusted. This SDN feature, in turn, provides the advantage (among others) of making it possible to modify the number of nodes of a certain type (e.g. increasing/decreasing the number of nodes of type "B" in the above example, according to dynamic criteria, such as usage of a certain service, availability/unavailability of certain control features, etc.) in an dynamic and easy manner.

One application of SDN is the dynamic service chaining of value-added-functions. In SDN, service chaining is a concept that refers to the forwarding of traffic of specific traffic types along a predefined set of service functions (VAS) called a "service chain". This implies that when a data packet enters the SDN domain, it has to be classified and, once classified, it can be forwarded to the next service function or to the gateway at the end of a service chain.

As per 3GPP 29.061, SGi is the reference point between the PDN-GW and the packet data network. The packet data network may be an operator external public or private packet data network or an intra-operator packet data network, e.g. for provision of IMS services. This reference point corresponds to Gi for 3GPP accesses.

SUMMARY

As will be explained in more detail below, the present inventors have found that known SDN architecture networks have certain limitations that can burden them with the unnecessary forwarding of control signalling traffic between nodes, leading to traffic congestion within the network as well as to a misallocation of resources at some of the network nodes.

More particularly, the inventors have found that these drawbacks of known SDN architecture networks stem from limitations in the forwarding mechanism employed by the network's forwarding elements and of the interface between the SDN controller and the forwarding elements, which only allows a dynamic and easy modification of the forwarding element's forwarding table based on the so-called "IP 5-tuple", which comprises an origination IP address, destination IP address, origination transport port, destination transport port and information on the transport protocol used over the IP protocol, e.g. TCP or UDP (i.e. only network layer (OSI layer 3) information and transport layer (OSI layer 4) information).

A consequence of the limitations identified by the inventors, which arises in the kind of conventional SDN architecture network discussed above, will now be explained with reference to the network schematically illustrated in FIG. 2, which differs from that of FIG. 1 by having an SDN architecture network 500 in place of the traditional network 400. In the example of FIG. 2, the SDN architecture network 500 comprises at least one forwarding element 510 (e.g. an OFS) and an SDN controller 520 that is arranged to configure the forwarding element 510 with the desired SDN settings, including an appropriate forwarding table etc. The forwarding element 510 in the SDN architecture network 500 will forward towards the second (VAS) node 300 not only user data packets conveying user data plane information of the second node's dynamically assigned UEs (in this example, only media packets D2 and D3 relating to user data planes of a limited set of UEs (i.e. UE2 and UE3), with the media packets D1 and D4 conveying user data plane information of UE1 and UE4 e.g. being forwarded to another node of type "B" according to the SDN settings) but, as illustrated in FIG. 2, also ALL the control signaling (i.e. RADIUS messages R1, R2, R3 and R4) conveying control signaling of ALL the UEs held by the first node 100 (i.e. all the packets conveying control signaling for UE1, UE2, UE3 and UE4), since their IP 5-tuples will match the forwarding criteria in the forwarding element's forwarding table. In other words, the forwarding element 510 will have no way of distinguishing user data packets from control data packets, much less the control data packets that are relevant to the second node 300 (in the above example, RADIUS messages R2 and R3 relating to UE2 and UE3) from other control data packets (RADIUS messages R1 and R4 relating to UE1 and UE4). This will result in an overload of the processing resources of the second node 300, as this should only receive and process user data packets (D2 and D3) relating to UE2 and UE3, and control data packets (i.e. RADIUS messages R2 and R3) conveying control signaling relevant to UE2 and UE3. In addition, the receipt by the second node 300 of control signaling for UEs not assigned to it (i.e. R1 and R4) may cause the second node 300 to allocate data processing resources (CPU time, memory etc.) for anticipated sessions with these UEs which, in fact, are not to be established.

These kinds of problem were found by the inventors to occur, for example, in scenarios where the second node 300 is a Service Aware Support Node (SASN) which opens each subscriber session when the corresponding RADIUS signaling traffic for that user session is received. Conventional SDN architectures have no mechanism that would allow only a selected part of the RADIUS signaling traffic to be routed to the second node 300. In conventional SDN architectures, all RADIUS traffic is forwarded (through SDN service chaining) towards the SASN, i.e. for all subscriber sessions. This will cause the SASN to open many idle (with no traffic) user sessions, and consequently waste valuable memory and CPU resources.

Having recognised these shortcomings of conventional SDN systems, the present inventors have devised an improved SDN architecture controller and forwarding element that allow advantages of conventional SDN architecture networks to be retained whilst addressing the problems identified above.

More specifically, the present inventors have devised an SDN architecture network, comprising a first network node and a second network node, the first network node being configured to transmit data packets comprising: user data packets belonging to two or more user data packet flows, the user data packets of each user data packet flow comprising user data plane information; and control data packets each comprising OSI layer 7 information for controlling the processing by the second network node of the user data packets of a respective one of the user data packet flows. The SDN architecture network further comprises an SDN architecture forwarding element configured to forward user data packets received from the first network node towards the second network node using forwarding information that links a forwarding address to information in an IP 5-tuple of a data packet. The SDN architecture forwarding element is further configured to selectively forward control data packets received from the first network node towards the second network node, and comprises: a receiver module configured to receive and store OSI layer 7 information and the forwarding information; a selection module configured to perform deep-packet inspection of a received control data packet to extract the OSI layer 7 information in the control data packet, and select the received control data packet for forwarding towards the second network node when the received control data packet is determined to comprise OSI layer 7 information matching the stored OSI layer 7 information; and a forwarding module configured to determine information in the IP 5-tuple of a received control data packet and, where the received control data packet has been selected for forwarding by the selection module, forward said control data packet towards the second network node using the forwarding information and the information in the IP 5-tuple of the control data packet. The SDN architecture network further comprises an SDN architecture controller configured to transmit the OSI layer 7 information and the forwarding information to the receiver module of the SDN architecture forwarding element.

The present inventors have further devised an SDN architecture forwarding element for forwarding data packets from a first network node to a second network node, the data packets comprising: user data packets belonging to two or more user data packet flows, the user data packets of each user data packet flow comprising user data plane information; and control data packets each comprising OSI layer 7 information for controlling the processing by the second network node of the user data packets of a respective one of the user data packet flows. The SDN architecture forwarding element is configured to forward user data packets received from the first network node towards the second network node using forwarding information that links a forwarding address to information in an IP 5-tuple of a data packet. The SDN architecture forwarding element is further configured to selectively forward control data packets received from the first network node towards the second network node, and comprises: a receiver module configured to receive from an SDN architecture controller and store OSI layer 7 information and the forwarding information; a selection module configured to perform deep-packet inspection of a received control data packet to extract the OSI layer 7 information in the control data packet, and select the received control data packet for forwarding towards the second network node when the received control data packet is determined to comprise OSI layer 7 information matching the stored OSI layer 7 information; and a forwarding module configured to determine information in the IP 5-tuple of the received control data packet and, where the received control data packet has been selected for forwarding by the selection module, forward said control data packet towards the second network node using the forwarding information and the information in the IP 5-tuple of the control data packet.

The present inventors have further devised an SDN architecture network controller for controlling the forwarding by an SDN architecture forwarding element of data packets from a first network node to a second network node, the data packets comprising: user data packets belonging to two or more user data packet flows, the user data packets of each user data packet flow comprising user data plane information; and control data packets each comprising OSI layer 7 information for controlling the processing by the second network node of the user data packets of a respective one of the user data packet flows. The SDN architecture network controller comprises a forwarding element configuration module arranged to generate forwarding information for forwarding a data packet received by the SDN architecture forwarding element towards the second network node, the forwarding information linking a forwarding address to information in an IP 5-tuple of a data packet, and OSI layer 7 information for determining whether to forward a received control data packet, the forwarding element configuration module being further configured to transmit the generated forwarding information and the OSI layer 7 information to the SDN architecture forwarding element.

The present inventors have further devised a method performed by a an SDN architecture forwarding element of forwarding data packets received from a first network node towards a second network node, wherein the data packets comprise: user data packets belonging to two or more user data packet flows, the user data packets of each user data packet flow comprising user data plane information; and control data packets each comprising OSI layer 7 information for controlling the processing by the second network node of the user data packets of a respective one of the user data packet flows. The method comprises selectively forwarding a control data packet received from the first network node towards the second network node by: receiving from an SDN architecture controller and storing OSI layer 7 information and forwarding information that links a forwarding address to information in an IP 5-tuple of a data packet; performing deep-packet inspection of the received control data packet to extract the OSI layer 7 information in the control data packet; selecting the received control data packet for forwarding towards the second network node when the received control data packet is determined to comprise OSI layer 7 information that matches the stored OSI layer 7 information; determining information in the IP 5-tuple of the received control data packet; and when the received control data packet has been selected for forwarding, forwarding said control data packet towards the second network node using the forwarding information and the information in the IP 5-tuple of the control data packet.

The present inventors have further devised a method performed by an SDN architecture network controller of configuring an SDN architecture forwarding element to forward data packets from a first network node towards a second network node that comprise: user data packets belonging to two or more user data packet flows, the user data packets of each user data packet flow comprising user data plane information; and control data packets each comprising OSI layer 7 information for controlling the processing by the second network node of the user data packets of a respective one of the user data packet flows. The method comprises generating forwarding information for forwarding a data packet received by the SDN architecture forwarding element towards the second network node, the forwarding information linking a forwarding address to information in an IP 5-tuple of a data packet, and generating OSI layer 7 information for determining whether to forward the received data packet towards the second network node. The method further comprises transmitting the generated forwarding information and the OSI layer 7 information to the SDN architecture forwarding element.

The present inventors have further devised a computer program product, comprising a non-transitory computer-readable storage medium or a signal, carrying computer program instructions which, when executed by a processor, cause the processor to perform at least one of the methods set out above.

BRIEF DESCRIPTION OF THE DRAWINGS

Embodiments of the invention will now be explained by way of example only, in detail, with reference to the accompanying figures, in which.

DETAILED DESCRIPTION

As will be explained in more detail below, in embodiments of the present invention, the conventional interface between the SDN controller and the forwarding element is modified so as to convey further information that, beyond the OSI layer 3 and layer 4 information in IP 5-tuples, identifies additional information to be used by the forwarding element for forwarding data packets. In particular, this interface has been modified by including Application Layer information (i.e. OSI layer 7 information) in the configuration data sent by the SDN controller to the SDN forwarding element, which allows the forwarding element to select data packets from among received data packets fulfilling the basic IP 5-tuple matching conditions (i.e. conventional SDN conditions), to forward the selected data packets according to the forwarding element's forwarding table (e.g. towards a certain node of type "B"), and to discard the remaining data packets.

Figure 2:
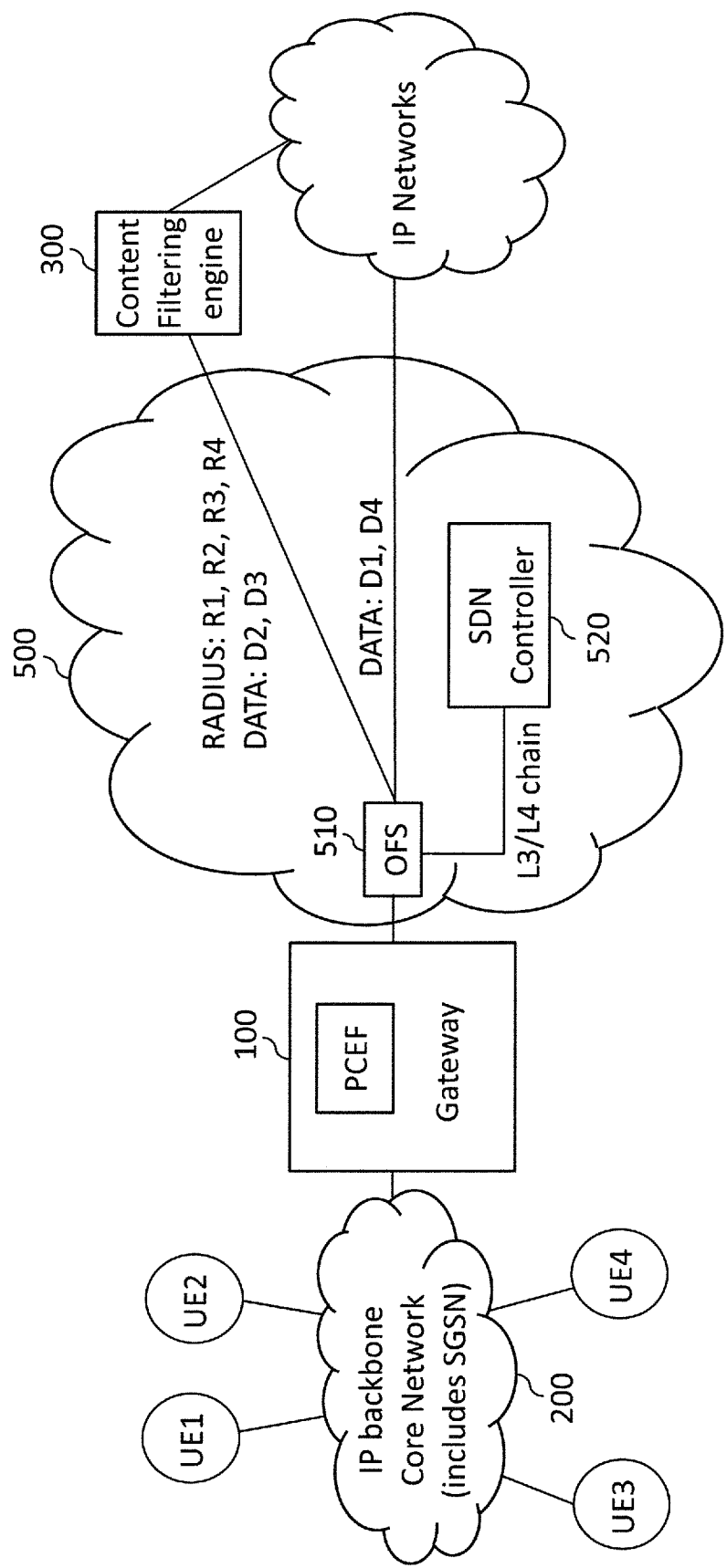
FIG. 2 is a schematic illustrating components of a conventional SDN architecture network.

Thus, if, for example, the IP 5-tuple of a received data packet matches forwarding criteria of a forwarding rule received from the SDN controller, the SDN forwarding element will further inspect beyond the IP 5-tuple of the received packet to determine whether the Application Layer information (e.g. a subscriber identifier associated with a certain UE) matches Application Layer information provided by the SDN controller and, if so, forward the data packet according to the forwarding rule, and otherwise discard it. In this way, the unnecessary forwarding of irrelevant control data packets to a node (in the example of FIG. 2, RADIUS messages R1 and R4) can be avoided, thereby reducing the processing load on the node. As the node consequently only receives control signaling relevant to its assigned processing task(s), the node may be provided with less processing capacity, making it cheaper to produce.

As will be explained in the following, this functionality can be achieved by modifying the functionalities of the SDN controller and of the SDN forwarding element(s) in the network, as well as the functionality of the signalling interface linking them, so as to allow the new OSI layer 7 information to be conveyed. In particular, the functionality of an SDN forwarding element is modified to allow it to perform inspection on received data packets that goes beyond inspecting the packets' IP 5-tuples (i.e. the so-called "Shallow Packet Inspection"), specifically to perform a deeper inspection (i.e. the so-called "Deep Packet Inspection") to determine OSI layer 7 information in the payload contents of a received data packet.

Figure 1:
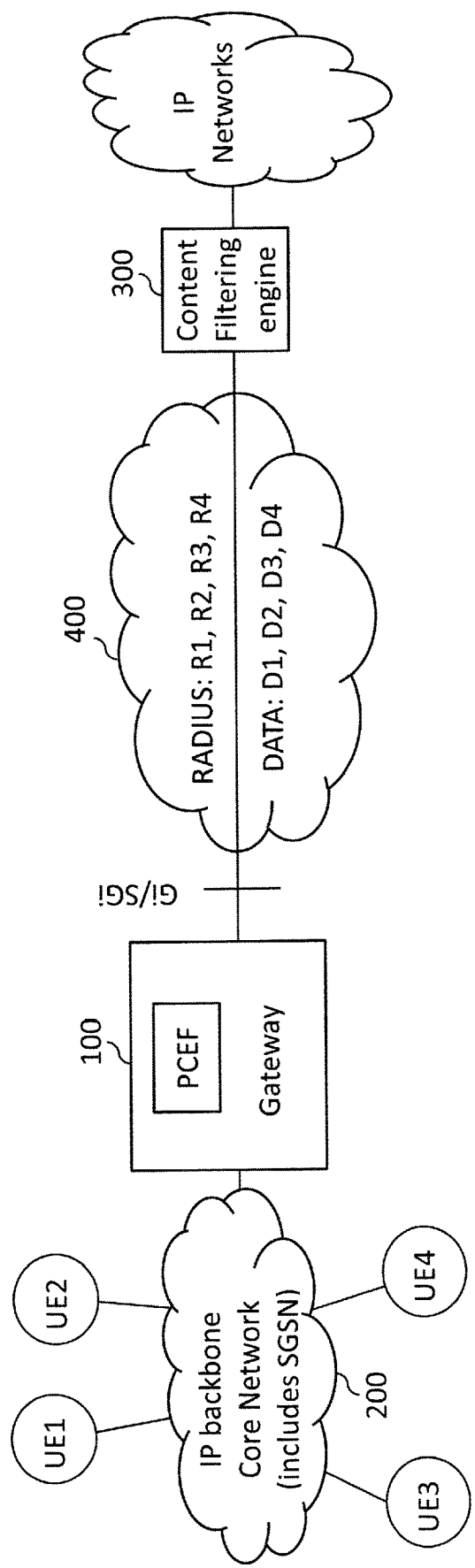
FIG. 1 is a schematic illustrating components of a conventional non-SDN architecture network.
Figure 3:
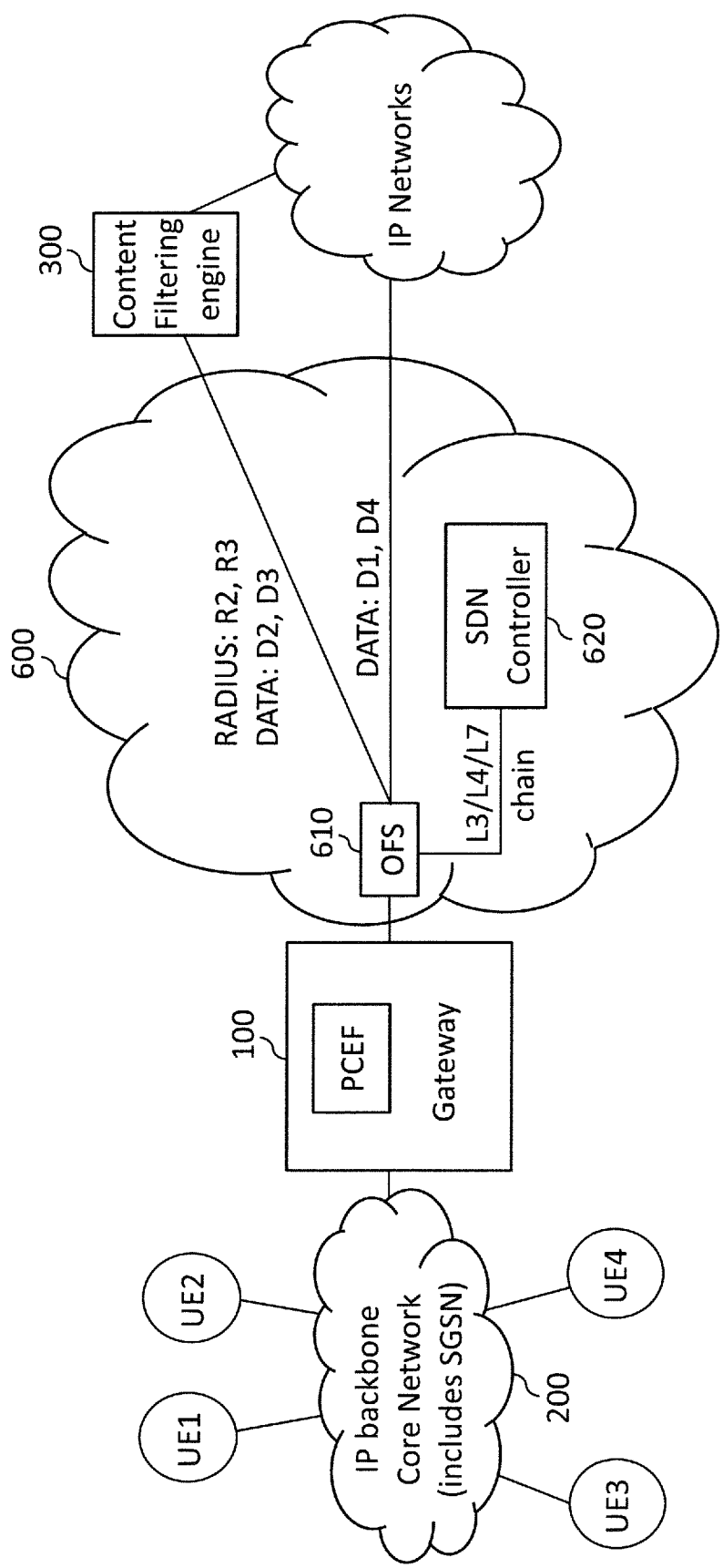
FIG. 3 is a schematic illustrating an SDN architecture network according to an embodiment of the present invention.

FIG. 3 is a schematic showing an SDN architecture network according to an embodiment of the present invention. The SDN architecture network comprises a first network node 100 and a second network node 300 that are the same as those described above with reference to FIGS. 1 and 2. Thus, the first network node 100 takes the exemplary form of a Gateway (e.g. a GGSN or a PDN-GW) having a (optional) PCEF, while the second network node 200 takes the exemplary form of a VAS node having a content filtering engine. The first network node 100 is arranged to receive a respective user data packet flow from each of two or more subscriber terminals (in the present embodiment, the four user terminals UE1 to UE4) by any suitable means; in the present example, the first network node 100 is arranged to receive the user data packet flows via an IP backbone Core Network 200. The second network node 300 may, as in the present embodiment, be arranged to forward the results of the content filtering performed thereby to an IP network (e.g. the Internet).

The first and second network nodes 100 and 300 are arranged to communicate with each other via an SDN architecture network 600 having one or more modified forwarding elements (by way of example, one such forwarding element, in the exemplary form of an OFS, is shown at 610 in FIG. 3) and an SDN controller 620 that is configured to communicate with the forwarding element(s) by any suitable communication scheme known to those skilled in the art. More particularly, according to an embodiment of the invention, the SDN controller 620 is configured to transmit to the forwarding element 610 an OSI Layer 3/Layer 4/Layer 7 (L3/L4/L7) chain comprising OSI layer 7 information in addition to the conventional forwarding information for configuring the forwarding element's forwarding table.

The first network node 100 is configured to receive user data packets in each of two or more user data packet flows from a respective subscriber terminal (i.e. a user data packet flow from each of UE1 to UE4), wherein the user data packets of each user data packet flow comprise user data plane information relating to a subscriber session associated with the respective subscriber terminal. The first network node 100 is further configured to transmit data packets of two types, namely: (i) the received user data packets; and (ii) control data packets each comprising OSI layer 7 (Application Layer) information (e.g. an identifier) for controlling the processing by a receiving node (i.e. the second node 300 and any other VAS node that the SDN architecture network 600 may route packets to) of the user data packets of a respective one of the user data packet flows. More particularly, the first node 100 is configured to transmit control data packets in the form of respective RADIUS messages R1, R2, R3 and R4, for controlling the processing by a recipient downstream node of user data packets in the user data packet flows originating from UE1, UE2, UE3 and UE4, respectively.

The OSI layer 7 information included in the L3/L4/L7 chain may take one of many different forms, which may be selected depending on the requirements of the particular application at hand. In the present embodiment, the second network node 300 is configured to provide a value-added service (i.e. content filtering) on an individual subscriber basis, and the OSI layer 7 information therefore preferably takes the form of a subscriber identifier that identifies one of the subscriber terminals UE1 to UE4. The subscriber identifier may, for example, be an International Mobile Subscriber Identity (IMSI), a Mobile Station International Subscriber Directory Number (MSISDN), or an IP address of the respective subscriber terminal. The subscriber identifier may alternatively identify a group of subscribers. In other embodiments, the VAS may be provided in dependence on other criteria, e.g. the geographical locations of the user terminals, hardware capabilities of the user terminals etc. so that the L7 information may alternatively identify a geographical location or region, terminal capability etc.

The SDN controller 620 is configured to provide the L7 information in association with corresponding forwarding information, i.e. such that each item of L7 information is linked to a corresponding item of forwarding information. Thus, for example, the SDN controller 620 is configured to send the forwarding element 610 information comprising L3/L4 information for comparing against information in the IP 5-tuple of a data packet received by the forwarding element, and L7 information for comparing with L7 information extracted by DPI from a data packet whose IP 5-tuple matches the L3/L4 information. The forwarding information comprises a forwarding address that is linked to the aforementioned L3/L4 information, such as the IP address of the second network node 300 (or, alternatively, an IP address for the "next hop" if the SDN 600 comprises a chain of forwarding elements for forwarding data packets to the second node 300). As will be explained in the following, the information in the L3/L4/L7 chain allows the forwarding element to, e.g. forward to a particular VAS node only control data packets that originate from a certain originating IP address, and which have L7 information matching the stored L7 information.

The SDN architecture forwarding element 610 is configured to selectively forward user data packets received from the first network node 100 towards the second network node 300 using the forwarding information supplied by the SDN controller 620, as will be explained further in the following.

Figure 4:
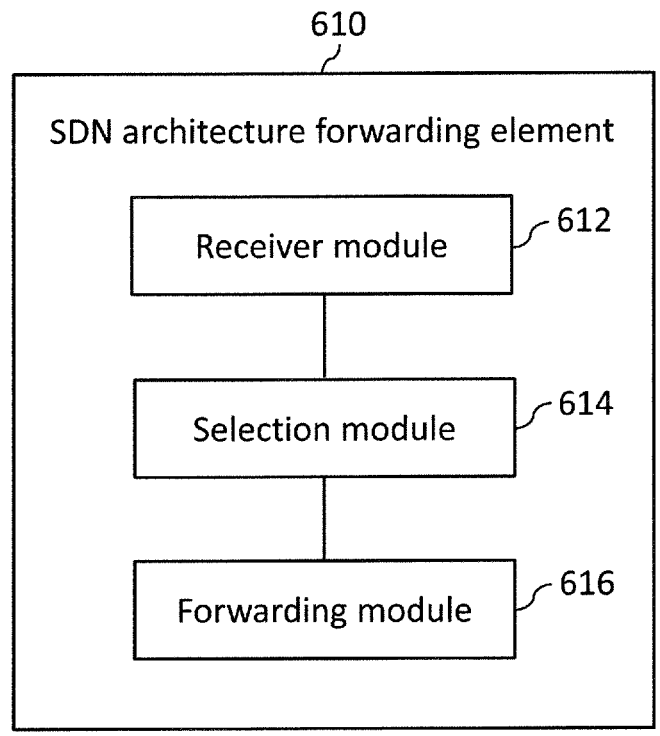
FIG. 4 is a block diagram showing components of an SDN architecture forwarding element according to an embodiment of the present invention.

FIG. 4 shows functional components of the SDN architecture forwarding element 610 that are helpful for understanding the present invention. The SDN architecture forwarding element 610 is configured to forward user data packets received from the first network node 100 towards the second network node 300 using the received forwarding information, and to selectively forward received control data packets towards the second network node 300. As shown in FIG. 4, the SDN architecture forwarding element 610 comprises a receiver module 612 configured to receive and store the L7 information and the forwarding information provided by the SDN controller 620. The SDN forwarding element 610 also includes a selection module 614 configured to perform DPI on a control data packet, which has been received from the first node 100 as a RADIUS message, to extract the L7 information in the control data packet and to select the received control data packet for forwarding towards the second node 300 when the received control data packet is determined to comprise L7 information that is the same as the stored L7 information. The SDN forwarding element 610 also includes a forwarding module 616 which is configured to extract information in the IP 5-tuple of the received control data packet and, where the received data packet has been selected for forwarding by the selection module 614, to forward said control data packet towards the second network node 300 using the forwarding information and the information in the IP 5-tuple of the control data packet.

Figure 5:
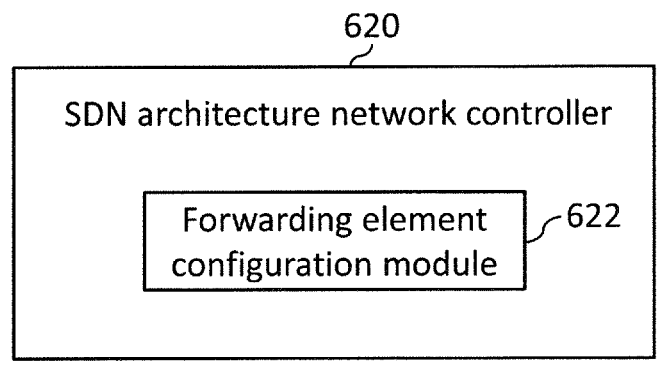
FIG. 5 is a block diagram showing components of an SDN architecture controller according to an embodiment of the present invention.

FIG. 5 shows functional components of the SDN architecture controller 620 that are helpful for understanding the present invention. As shown in FIG. 5, the SDN architecture controller 620 comprises a forwarding element configuration module 622 arranged to generate and transmit to the SDN forwarding element 610 the aforementioned L3/L4/L7 chain comprising the forwarding information and the L7 information, to configure its forwarding functionality.

Figure 6:
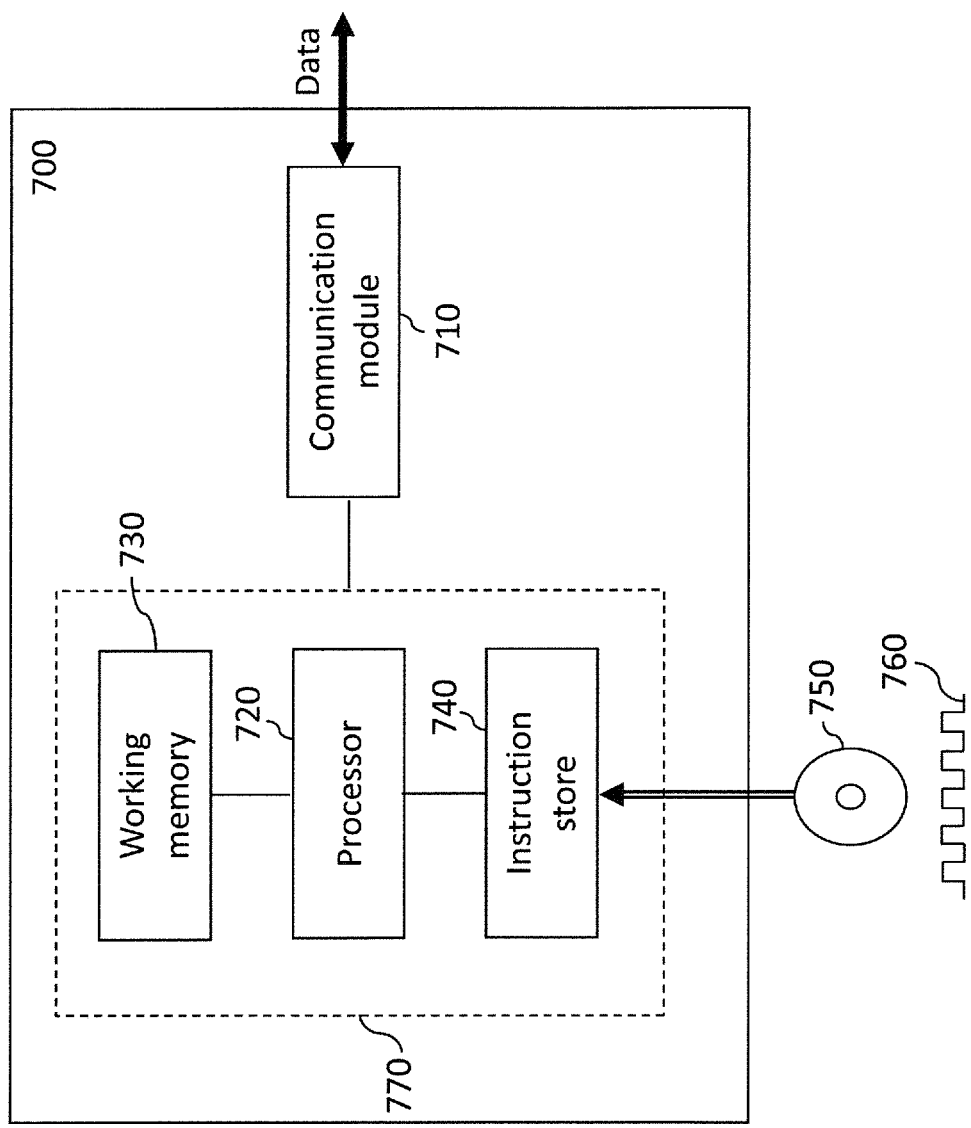
FIG. 6 is a block diagram illustrating an example of signal processing hardware that may configured to function as an SDN architecture controller or an SDN architecture forwarding element according to an embodiment of the present invention.

An example of a general kind of programmable signal processing apparatus in which the functionality of the SDN forwarding element or the SDN controller may be implemented is shown in FIG. 6. The signal processing apparatus 700 shown (which may be a server, for example) comprises a communications module 710, a processor 720, a working memory 730, and an instruction store 740 storing computer-readable instructions which, when executed by the processor 720, cause the processor 720 to perform the processing operations hereinafter described to forward data packets or (as the case may be) to configure an SDN forwarding element.

The instruction store 740 is a data storage device which may comprise a non-volatile memory, for example in the form of a ROM, a magnetic computer storage device (e.g. a hard disk) or an optical disc, which is pre-loaded with the computer-readable instructions. Alternatively, the instruction store 740 may comprise a volatile memory (e.g. DRAM or SRAM), and the computer-readable instructions can be input thereto from a computer program product, such as a computer-readable storage medium 750 (e.g. an optical disc such as a CD-ROM, DVD-ROM etc.) or a computer-readable signal 760 carrying the computer-readable instructions.

The working memory 730 functions to temporarily store data to support the processing operations executed in accordance with the processing logic stored in the instruction store 740. As shown in FIG. 6, the communications module 710 is arranged to communicate with the processor 720 so as to render the signal processing apparatus 700 capable of processing received signals and communicating its processing results.

In the present embodiment, the combination 770 of the processor 720, working memory 730 and the instruction store 740 (when appropriately programmed by techniques familiar to those skilled in the art) together constitute the receiver module 612, the selection module 614 and the forwarding module 616 of the SDN forwarding element 610. The combination 770 can also be configured to perform the operations of the forwarding element configuration module 622 of the SDN controller 620 that are described herein.

Figure 7:
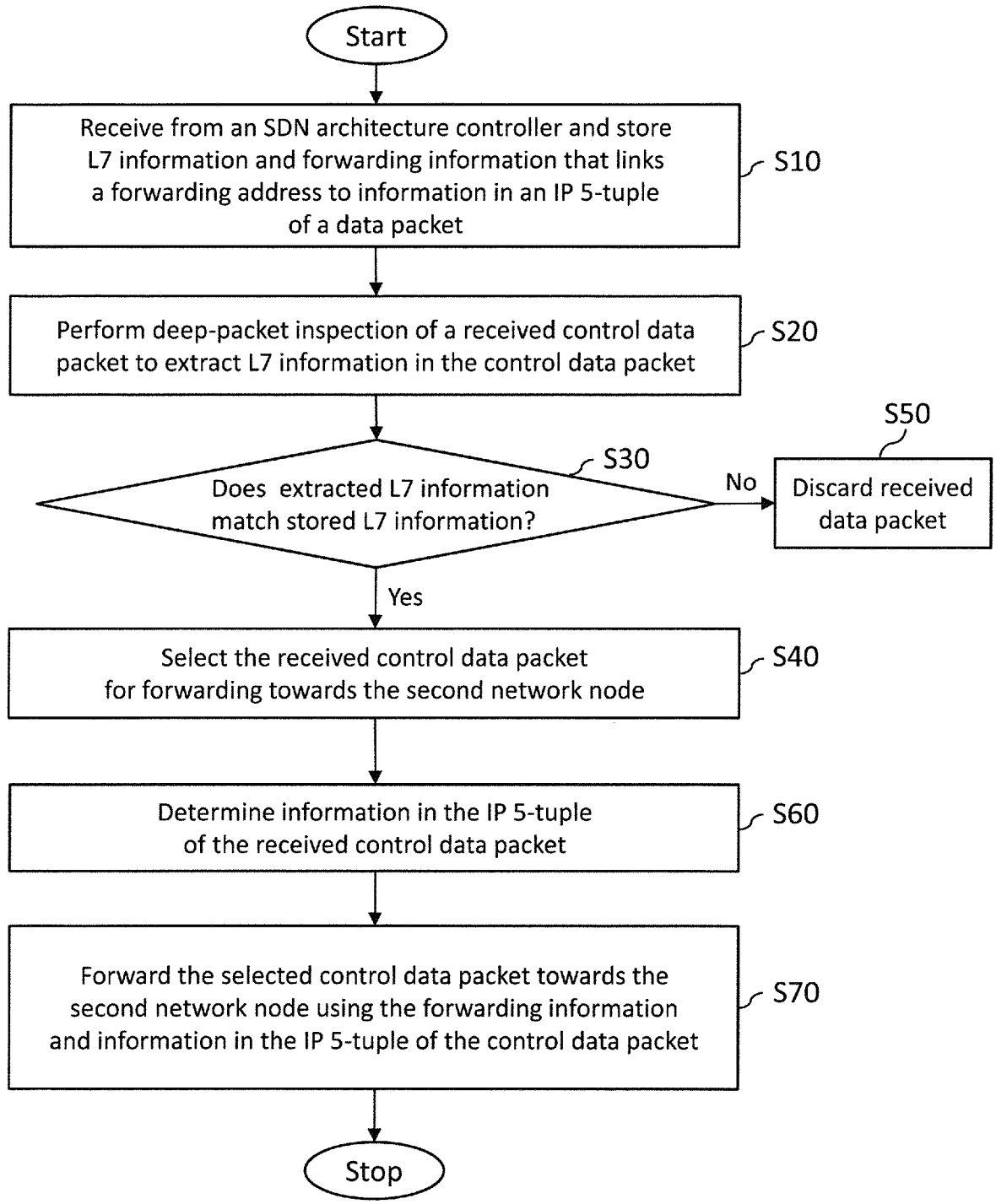
FIG. 7 is a flow diagram illustrating processing operations performed by an SDN architecture forwarding element according to an embodiment of the present invention.

As well as forwarding received user data packets towards the second network node 300 using the stored forwarding information and information extracted from the IP 5-tuples of the received data packets by SPI (as in the case of a conventional SDN forwarding element), the forwarding element 610 is further configured to selectively forward towards the second network node 300 only the relevant control data packets that have been received from the first network node 100, as will now be described with reference to FIG. 7.

Firstly, in step S10, the receiver module 612 receives from the SDN architecture controller 620 and stores in the memory 730 a L3/L4/L7 chain comprising a subscriber identifier (e.g. IMSI, MSISDN or subscriber IP address) as L7 information, as well as the forwarding address described above (e.g. the IP address of the second network node 300) in association with L3/L4 information for comparing against information in the IP 5-tuple of a received data packet.

In step S20, the selection module 614 performs DPI of a control data packet received from the first SDN network node 100 (in the form of a RADIUS message) to extract the subscriber identifier in the control data packet.

In step S30, the selection module 614 determines whether the subscriber identifier extracted from the received data packet in step S20 matches (i.e. is the same as) the subscriber identifier stored by the SDN forwarding element 610 and, if a match is found, proceeds to select the received control data packet for forwarding towards the second node 300 in step S40. On the other hand, when no match is found, the selection module 614 determines in step S50 that the received control data packet is not to be forwarded to the second node 300, and may therefore be discarded from further processing.

In step S60, forwarding module 616 determines relevant information in the IP 5-tuple of the received control data packet and, if the received control data packet has been selected for forwarding in step S40, forwards that control data packet towards the second network node 300 in step S70, using the forwarding information and the information in the IP 5-tuple of the control data packet. More particularly, the forwarding module 616 forwards the data packet to the forwarding address that is associated with L3/L4 information that matches the extracted information in the data packet's IP 5-tuple.

Figure 8:
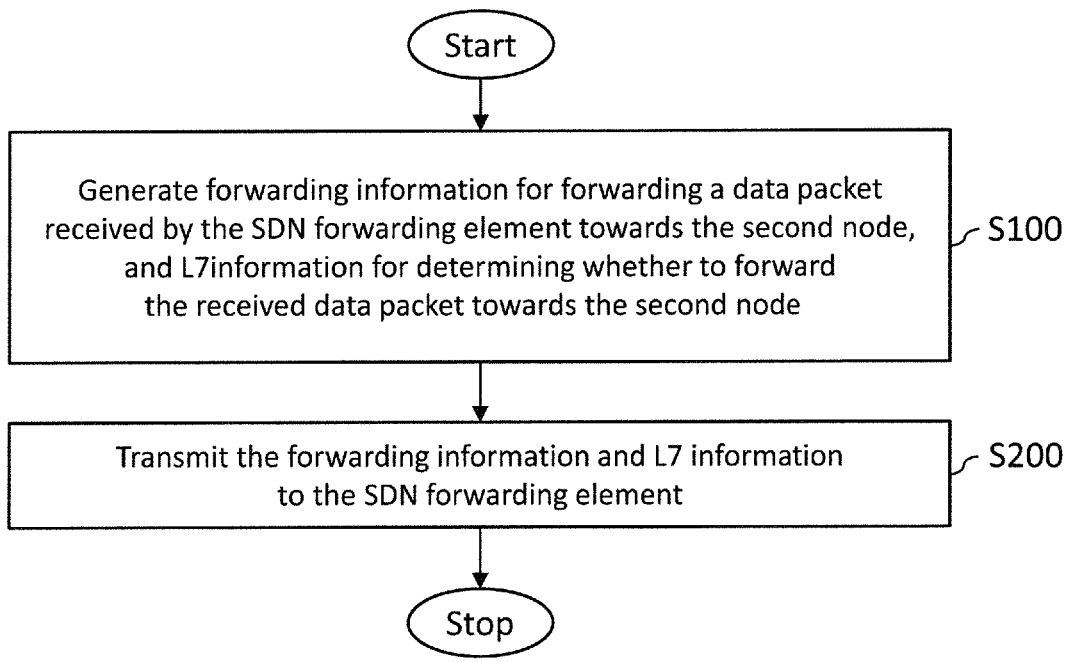
FIG. 8 is a flow diagram illustrating processing operations performed by an SDN architecture controller according to an embodiment of the present invention.

A process performed by the SDN architecture network controller 620 of configuring the SDN architecture forwarding element 610 to forward data packets from the first network node 100 towards the second network node 300 will now be described with reference to FIG. 8.

In step S100, the forwarding element configuration module 622 of the SDN controller 620 generates (e.g. based on a user input or control message(s) received from the VAS node(s) or the first node 100) forwarding information for forwarding a data packet received by the SDN forwarding element 610 towards the second network node 300, as well as L7 information (in the exemplary form of the subscriber identifier mentioned above) for determining whether to forward a received control data packet.

In step S200, the forwarding element configuration module 622 sends the generated forwarding information and the L7 information to the receiver module 612 of the SDN forwarding element 610. Once this information has been transmitted, the process ends. The SDN controller 620 thus informs the SDN forwarding element 610 of which subscriber sessions are to be handled by the VAS node 300.

The result of the above-described functionality of the SDN forwarding element 610 and the SDN controller 620 of the present embodiment is illustrated in FIG. 3; the second (VAS) node 300 receives, in addition to the user data packets D2 and D3 relating to the subscriber sessions involving data streams from UE2 and UE3, the RADIUS messages R2 and R3 that are required for providing the VAS in those subscriber sessions. Redundant RADIUS control signalling (comprising R1 and R4) is not forwarded to the second node 300, in contrast to the conventional system shown in FIG. 2.

Figure 9A:
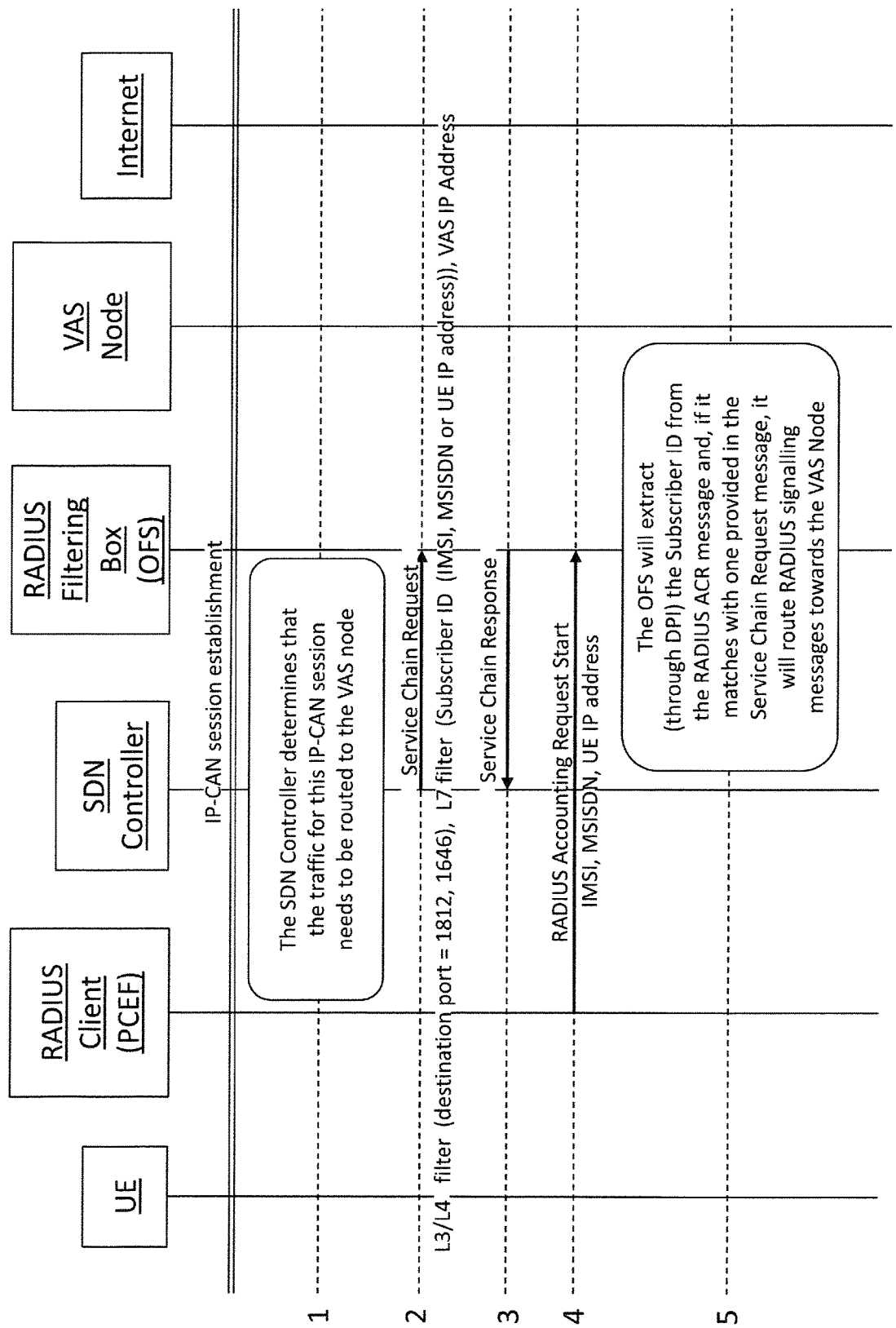
FIGS. 9A and 9B are sequence diagrams illustrating an exchange of messages that occurs between components of an SDN architecture network according to an embodiment of the present invention.
Figure 9B:
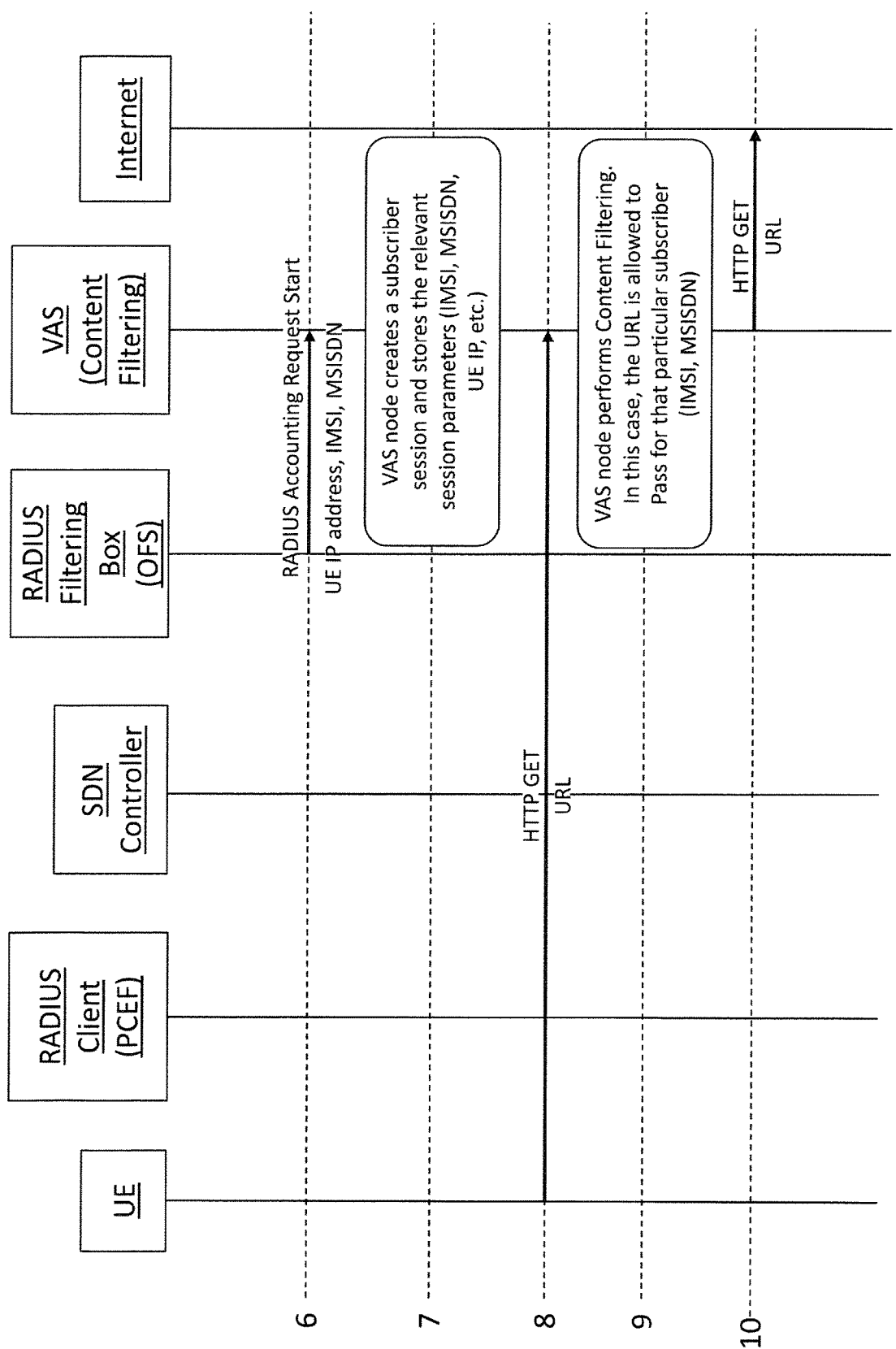

Further details of the interactions that can occur between the components of the SDN architecture network illustrated in FIG. 3, in the case where the VAS node 300 needs to be involved in the SDN chain for a certain IP-CAN session (e.g. to perform content filtering) and also needs the RADIUS signalling for that IP-CAN session, will now be described with reference to FIGS. 9A and 9B.

Step 1: At IP-CAN session establishment, the SDN controller 620 will determine that the traffic for this IP-CAN session needs to be routed to the VAS node 300.

Step 2: The SDN controller 620 will trigger a Service Chain Request message towards the OFS 610, including:
L3/L4 information: e.g. the destination ports of RADIUS signaling traffic: (1812, 1646)
L7 information: e.g. the subscriber ID (IMSI, MSISDN or UE IP address).
VAS node IP address.

Step 3: The OFS 610 will acknowledge with a Service Chain Response message.

Step 4: As part of the IP-CAN session establishment, the RADIUS client (e.g. PCEF in the first node 100) will trigger a RADIUS Accounting Request Start message. It is assumed the network configuration allows the OFS 610 to receive as input all RADIUS signaling traffic.

It may be the case that Step 4 happens before (or in parallel) with Steps 2 and 3. In order to cover that possibility, the OFS 610 could store the RADIUS session for a short period of time, and actually start a new session to the VAS node 300 if required (if done carefully, the OFS 610 can link out and not be a proxy all the time, but just an IP forwarder.

Steps 5 and 6: The OFS 610 will retrieve (through DPI) the subscriber identity (IMSI, MSISDN or UE IP address) from the RADIUS Accounting Request Start message. As there is a matching IMSI/MSISDN or UE IP address previously stored (from the Service Chain Request message in Step 2), the OFS 610 will route this RADIUS message towards the corresponding VAS node IP address.

Step 7: The VAS node 300 will open a new subscriber session and store the relevant session parameters (IMSI, MSISDN, UE IP address, etc.).

Step 8: User data traffic (e.g. HTTP GET with a certain URL) will be routed towards the VAS node 300.

Step 9 and 10: The VAS node 300 will perform the relevant processing. In this case, the VAS node 300 will perform content filtering. In this example, the URL is allowed to pass for that particular subscriber (identified by their IMSI or MSISDN, for example).

Modifications and Variations

Many modifications and variations can be made to the embodiments described above.

For example, the order of some of the process steps in FIG. 7 may be changed. Step S60 may, for example, precede any of steps S10 to S30, and the forwarding address may be determined by the forwarding module 616 by performing SPI on a received data packet before the selection is made in step S40; in this case, step S40 can be regarded as a subsequent "checking" or "filtering" step that prevents the forwarding element 610 from forwarding irrelevant control data packets to the second node 300. Similarly, the DPI of step S20 may be performed before step S10.

The embodiment described above is concerned with the case where the SDN network 600 is configured to forward traffic to a single second node 300, and the L3/L4/L7 chain consequently contains a single set of values of L3/L4 information, a forwarding address and L7 information that are associated with one another. However, the SDN controller 620 may more generally be configured to provide the receiver module 612 with two or more such chains of L3/L4/L7 information which, when stored in the forwarding element 610, may be visualised as rows in a table containing the L3/L4 information, the forwarding address and the L7 information as respective columns. In such embodiments, the selection module 614 may compare information in the IP 5-tuple of a received control data packet (obtained by SPI) with the L3/L4 information in the entries of the stored table to look for a match and, when a match is found, select the data packet for forwarding to the forwarding address associated with the matching L3/L4 information only if the L7 information extracted by DPI from the received control data packet matches the L7 information associated with the matching L3/L4 information and forwarding address.

As an addition to the embodiments described herein, when the SDN forwarding element 610 selects the corresponding VAS node 300, it could as well, not just send RADIUS signaling to the VAS node 300 as end-point, but instead to an internal entity of the VAS node 300 that will actually process the RADIUS message and create the session. In the case of SASN, as it is a cluster of servers, there another forwarding function will be provided to steer the RADIUS messages to the appropriate server. Today, that is done internally in the cluster, to make sure that RADIUS message for a given user and the traffic session for the same user go to the same server. The forwarding element 610 (and, in particular, the forwarding module 616 thereof) may therefore be adapted to selectively forward control data packets using internal traffic steering policies of the VAS node 300 to simplify the logic within the VAS node 300.

The invention claimed is:

1. A software-defined networking (SDN) architecture forwarding element for selectively forwarding data packets from a first network node to a second network node, the data packets comprising:
    user data packets belonging to two or more user data packet flows transmitted from the first network node to a plurality of further network nodes comprising the second network node, the user data packets of each user data packet flow comprising user data plane information; and
    control data packets each comprising OSI layer 7 information for controlling processing by a network node of the plurality of further network nodes of the user data packets of a respective one of the two or more user data packet flows transmitted to the network node, wherein the SDN architecture forwarding element is configured to receive the user data packets from the first network node and selectively forward each of the received user data packets towards the second network node using forwarding information that links a respective forwarding address to information in an IP 5-tuple of a user data packet, the SDN architecture forwarding element being further configured to receive the control data packets from the first network node and selectively forward the received control data packets towards the second network node such that, of the received control data packets, only the control data packets for controlling processing, by the second network node of the user data packets of one or more of the two or more user data packet flows transmitted to the second network node are forwarded towards the second network node;

the SDN architecture forwarding element comprising:
  processing circuitry; and
  memory containing instructions executable by the processing circuitry whereby the SDN architecture forwarding element is operative to:
    receive, from an SDN architecture controller, the forwarding information and OSI layer 7 information indicative of the one or more user data packet flows transmitted to the second network node;
    store the received forwarding information and OSI layer 7 information indicative of the one or more user data packet flows transmitted to the second network node;
    perform deep-packet inspection of a received one of the control data packets to extract the OSI layer 7 information in the received control data packet, and select the received control data packet for forwarding towards the second network node when the received control data packet is determined to comprise OSI layer 7 information matching the stored OSI layer 7 information; and
    determine information in an IP 5-tuple of the received control data packet, wherein the received control data packet has been selected for forwarding by a selection module, to forward the selected control data packet towards the second network node using the forwarding information and the information in the IP 5-tuple of the control data packet.

2. The SDN architecture forwarding element of claim 1, wherein the instructions are such that the SDN architecture forwarding element is operative to:
  receive, from the first network node, the two or more user data packet flows, each generated by a respective subscriber device, and the control data packets each comprising, as the OSI layer 7 information, a subscriber device identifier that identifies a respective one of the subscriber devices;
  receive, from the SDN architecture controller, a subscriber device identifier and store the received subscriber device identifier as the OSI layer 7 information; and
  perform deep-packet inspection of the received control data packet to extract the respective subscriber device identifier in the control data packet, and select the received control data packet for forwarding towards the second network node when the received control data packet is determined to comprise a subscriber device identifier matching the stored subscriber device identifier.

3. The SDN architecture forwarding element of claim 2, wherein each subscriber device identifier is one of an International Mobile Subscriber Identity, a Mobile Station International Subscriber Directory Number, and an IP address of the respective subscriber device.

4. The SDN architecture forwarding element of claim 1, wherein the instructions are such that the SDN architecture forwarding element is operative to receive the control data packets as respective RADIUS protocol messages.

5. The SDN architecture forwarding element of claim 1, wherein the SDN architecture forwarding element is an OpenFlow switch.

6. A software-defined networking (SDN) architecture network, comprising:
  a first network node and a plurality of further network nodes comprising a second network node, the first network node being configured to transmit data packets to the plurality of further network nodes, the data packets comprising:
    user data packets belonging to two or more user data packet flows, the user data packets of each user data packet flow comprising user data plane information; and
    control data packets each comprising OSI layer 7 information for controlling processing, by a network node of the plurality of further network nodes of the user data packets of a respective one of the two or more user data packet flows transmitted to the network node;
  an SDN architecture forwarding element selectively forwarding the data packets from the first network node to the second network node, wherein the SDN architecture forwarding element is configured to receive the user data packets from the first network node and selectively forward each of the received user data packets towards the second network node using forwarding information that links a respective forwarding address to information in an IP 5-tuple of a user data packet, the SDN architecture forwarding element being further configured to receive the control data packets from the first network node and selectively forward the received control data packets towards the second network node such that, of the received control data packets, only the control data packets for controlling processing by the second network node of the user data packets of one or more of the two or more user data packet flows transmitted to the second network node are forwarded towards the second network node,
  wherein the SDN architecture forwarding element comprises:
    processing circuitry; and
    memory containing instructions executable by the processing circuitry whereby the SDN architecture forwarding element is operative to:
      receive, from an SDN architecture controller, the forwarding information and OSI layer 7 information indicative of the one or more user data packet flows transmitted to the second network node;
      store the received forwarding information and OSI layer 7 information indicative of the one or more user data packet flows transmitted to the second network node;
      perform deep-packet inspection of a received one of the control data packets to extract the OSI layer 7 information in the received control data packet, and select the received control data packet for forwarding towards the second network node when the received control data packet is determined to comprise OSI layer 7 information matching the stored OSI layer 7 information; and
determine information in an IP 5-tuple of the received control data packet, wherein the received control data packet has been selected for forwarding by a selection module, to forward the selected control data packet towards the second network node using the forwarding information and the information in the IP 5-tuple of the control data packet; and
the SDN architecture controller configured to transmit the OSI layer 7 information and the forwarding information to the SDN architecture forwarding element.

7. The SDN architecture network of claim 6, wherein:
the first network node is configured to receive each user data packet flow from a respective subscriber device, and to transmit the control data packets each comprising, as the OSI layer 7 information, a subscriber device identifier that identifies a respective one of the subscriber devices;
the SDN architecture controller is configured to transmit a subscriber device identifier to the SDN architecture forwarding element as the OSI layer 7 information,
wherein the instructions are such that the SDN architecture forwarding element is operative to:
receive and store the subscriber device identifier transmitted by the SDN architecture controller; and
perform deep-packet inspection of the received control data packet to extract the respective subscriber device identifier in the control data packet, and select the received control data packet for forwarding towards the second network node when the received control data packet is determined to comprise a subscriber device identifier matching the stored subscriber device identifier.

8. The SDN architecture network of claim 6, wherein the first network node is a network gateway and the second network node is a Value-Added Service node.

9. The SDN architecture network of claim 6, wherein the first network node is configured to transmit the control data packets as respective RADIUS protocol messages.

10. A software-defined networking (SDN) architecture network controller for controlling selective forwarding by an SDN architecture forwarding element of data packets from a first network node to a second network node, the data packets comprising:
user data packets belonging to two or more user data packet flows transmitted from the first network node to a plurality of further network nodes comprising the second network node, the user data packets of each user data packet flow comprising user data plane information; and
control data packets each comprising OSI layer 7 information for controlling processing by a network node of the plurality of further network nodes of the user data packets of a respective one of the two or more user data packet flows transmitted to the network node,
the SDN architecture network controller comprising:
processing circuitry; and
memory containing instructions executable by the processing circuitry whereby the SDN architecture network controller is operative to:
generate forwarding information for selectively forwarding each of the data packets received by the SDN architecture forwarding element towards the second network node, the forwarding information linking a respective forwarding address to information in an IP 5-tuple of each received data packet, and OSI layer 7 information that is indicative of one or more of the two or more user data packet flows transmitted to the second network node and for determining whether to forward each received control data packet towards the second network node such that, of the received control data packets, only the control data packets for controlling processing by the second network node of the user data packets of the one or more user data packet flows transmitted to the second network node are forwarded towards the second network node; and
transmit the generated forwarding information and the OSI layer 7 information to the SDN architecture forwarding element.

11. The SDN architecture network controller of claim 10, wherein the instructions are such that the SDN architecture network controller is operative to generate, as the OSI layer 7 information, a subscriber device identifier identifying a subscriber device that is configured to generate one of the one or more user data packet flows to be forwarded by the SDN architecture forwarding element towards the second network node.

12. The SDN architecture network controller of claim 11, wherein the subscriber device identifier is one of an International Mobile Subscriber Identity, a Mobile Station International Subscriber Directory Number, and an IP address of the subscriber device.

13. The SDN architecture network controller of claim 10, wherein the SDN architecture forwarding element is an OpenFlow switch.

14. A method, performed by a software-defined networking (SDN) architecture forwarding element, of selectively forwarding data packets received from a first network node towards a second network node, wherein the data packets comprise:
user data packets belonging to two or more user data packet flows transmitted from the first network node to a plurality of further network nodes comprising the second network node, the user data packets of each user data packet flow comprising user data plane information; and
control data packets each comprising OSI layer 7 information for controlling processing, by a network node of the plurality of further network nodes, of the user data packets of a respective one of the two or more user data packet flows transmitted to the network node,
the method comprising receiving the control data packets from the first network node and selectively forwarding each received control data packet towards the second network node by:
receiving, from an SDN architecture controller, OSI layer 7 information indicative of one or more of the two or more user data packet flows transmitted to the second network node and forwarding information that links a forwarding address to information in an IP 5-tuple of a received control data packet;
storing the received OSI layer 7 information indicative of the one or more user data packet flows transmitted to the second network node and the forwarding information;
performing deep-packet inspection of the received control data packet to extract the OSI layer 7 information in the received control data packet;
selecting the received control data packet for forwarding towards the second network node when the received control data packet is determined to comprise OSI layer 7 information that matches the stored OSI layer 7 information;

determining information in the IP 5-tuple of the received control data packet; and when the received control data packet has been selected for forwarding, forwarding the received control data packet towards the second network node using the forwarding information and the information in the IP 5-tuple of the received control data packet such that, of the received control data packets, only the control data packets for controlling processing by the second network node of the user data packets of the one or more user data packet flows transmitted to the second network node are forwarded towards the second network node.

15. The method according to claim 14, further comprising:

receiving, from the first network node, the two or more user data packet flows, each generated by a respective subscriber device, and the control data packets each comprising, as the OSI layer 7 information, a subscriber device identifier that identifies a respective one of the subscriber devices, wherein the SDN architecture forwarding element selectively forwards a control data packet received from the first network node towards the second network node by:

receiving, from the SDN architecture controller, a subscriber device identifier as the OSI layer 7 information;

storing the subscriber device identifier, received from the SDN architecture controller, as the OSI layer 7 information;

performing deep-packet inspection of the received control data packet to extract the respective subscriber device identifier in the control data packet as the OSI layer 7 information; and selecting the received control data packet for forwarding towards the second network node when the received control data packet is determined to comprise a subscriber device identifier that matches the stored subscriber device identifier.

16. The method of claim 15, wherein each subscriber device identifier is one of an International Mobile Subscriber Identity, a Mobile Station International Subscriber Directory Number, and an IP address of the respective subscriber device.

17. The method of claim 14, wherein the control data packets are received as respective RADIUS protocol messages.

18. The method of claim 14, wherein the SDN architecture forwarding element is an OpenFlow Switch.

19. A method performed by a software-defined networking (SDN) architecture network controller in an SDN network comprising:

a first network node and a plurality of further network nodes including a second network node, the first network node being configured to transmit data packets to the plurality of further network nodes, the data packets comprising:

user data packets belonging to two or more user data packet flows, the user data packets of each user data packet flow comprising user data plane information; and control data packets each comprising OSI layer 7 information for controlling processing, by a network node of the plurality of further network nodes of the user data packets of a respective one of the two or more user data packet flows transmitted to the network node; and an SDN architecture forwarding element, the method comprising configuring the SDN architecture forwarding element to selectively forward the data packets from the first network node towards the second network node by:

generating forwarding information for selectively forwarding each of the data packets received by the SDN architecture forwarding element towards the second network node, the forwarding information linking a respective forwarding address to information in an IP 5-tuple of each received data packet;

generating OSI layer 7 information that is indicative of one or more of the two or more user data packet flows transmitted to the second network node and for determining whether to forward each of the received control data packets towards the second network node such that, of the received control data packets, only the control data packets for controlling processing by the second network node of the user data packets of the one or more user data packet flows transmitted to the second network node are forwarded towards the second network node; and transmitting the generated forwarding information and the generated OSI layer 7 information to the SDN architecture forwarding element.

20. The method of claim 19, wherein the generating the OSI layer 7 information comprises generating a subscriber device identifier identifying a subscriber device that is configured to generate one of the one or more user data packet flows to be forwarded by the SDN architecture forwarding element towards the second network node.

21. The method of claim 20, wherein the subscriber device identifier is one of an International Mobile Subscriber Identity, a Mobile Station International Subscriber Directory Number, and an IP address of the subscriber device.

22. The method of claim 19, wherein the SDN architecture forwarding element is an OpenFlow Switch.

23. A non-transitory computer readable recording medium storing a computer program product for controlling a software-defined networking (SDN) architecture forwarding element to selectively forward data packets received from a first network node towards a second network node, wherein the data packets comprise:

user data packets belonging to two or more user data packet flows transmitted from the first network node to a plurality of further network nodes comprising the second network node, the user data packets of each user data packet flow comprising user data plane information; and control data packets each comprising OSI layer 7 information for controlling processing by a network node of the plurality of further network nodes of the user data packets of a respective one of the two or more user data packet flows transmitted to the network node, the computer program product comprising software instructions which, when run on processing circuitry of the SDN architecture forwarding element, cause the SDN architecture forwarding element to receive the control data packets from the first network node and selectively forward each received control data packet towards the second network node by:

receiving, from an SDN architecture controller, OSI layer 7 information indicative of one or more of the two or more user data packet flows transmitted to the second network node and forwarding information that links a forwarding address to information in an IP 5-tuple of a received control data packet;

storing the received OSI layer 7 information indicative of the one or more of the user data packet flows transmitted to the second network node and the forwarding information;

performing deep-packet inspection of the received control data packet to extract the OSI layer 7 information in the received control data packet;

selecting the received control data packet for forwarding towards the second network node when the received control data packet is determined to comprise OSI layer 7 information that matches the stored OSI layer 7 information;

determining information in the IP 5-tuple of the received control data packet; and when the received control data packet has been selected for forwarding, forwarding the control data packet towards the second network node using the forwarding information and the information in the IP 5-tuple of the control data packet such that, of the received control data packets, only the control data packets for controlling processing, by the second network node of the user data packets of the one or more user data packet flows transmitted to the second network node are forwarded towards the second network node.

24. A non-transitory computer readable recording medium storing a computer program product for controlling a software-defined networking (SDN) architecture network controller in an SDN network, the SDN network comprising:

a first network node and a plurality of further network nodes including a second network node, the first network node being configured to transmit data packets to the plurality of further network nodes, the data packets comprising:

user data packets belonging to two or more user data packet flows, the user data packets of each user data packet flow comprising user data plane information; and control data packets each comprising OSI layer 7 information for controlling processing by a network node of the plurality of further network nodes of the user data packets of a respective one of the two or more user data packet flows transmitted to the network node; and an SDN architecture forwarding element;

the computer program product comprising software instructions which, when run on processing circuitry of the SDN architecture network controller, cause the SDN architecture network controller to configure the SDN architecture forwarding element to selectively forward the data packets from the first network node towards the second network node by:

generating forwarding information for selectively forwarding each of the data packets received by the SDN architecture forwarding element towards the second network node, the forwarding information linking a respective forwarding address to information in an IP 5-tuple of each received data packet;

generating OSI layer 7 information that is indicative of one or more of the two or more user data packet flows transmitted to the second network node and for determining whether to forward each of the received control data packets towards the second network node such that, of the received control data packets, only the control data packets for controlling processing by the second network node of the user data packets of the one or more user data packet flows transmitted to the second network node are forwarded towards the second network node; and transmitting the generated forwarding information and the generated OSI layer 7 information to the SDN architecture forwarding element.

* * * * *